United States Patent
Ferrari et al.

(10) Patent No.: US 10,570,284 B2
(45) Date of Patent: *Feb. 25, 2020

(54) POLYESTER BLENDS WITH IMPROVED OXYGEN SCAVENGING ABILITY

(71) Applicant: APG Polytech, LLC, Wilmington, DE (US)

(72) Inventors: Gianluca Ferrari, Portograuaro (IT); D. Jeffrey Black, Akron, OH (US)

(73) Assignee: APG Polytech, LLC, Wilmington, DE (US)

( * ) Notice: Subject to any disclaimer, the term of this patent is extended or adjusted under 35 U.S.C. 154(b) by 164 days.

This patent is subject to a terminal disclaimer.

(21) Appl. No.: 15/735,642

(22) PCT Filed: Jun. 10, 2016

(86) PCT No.: PCT/US2016/037028
§ 371 (c)(1),
(2) Date: Dec. 12, 2017

(87) PCT Pub. No.: WO2016/201331
PCT Pub. Date: Dec. 15, 2016

(65) Prior Publication Data
US 2018/0319983 A1    Nov. 8, 2018

Related U.S. Application Data

(60) Provisional application No. 62/174,593, filed on Jun. 12, 2015, provisional application No. 62/174,603, filed on Jun. 12, 2015, provisional application No. 62/174,631, filed on Jun. 12, 2015, provisional application No. 62/180,861, filed on Jun. 17, 2016.

(51) Int. Cl.
| | |
|---|---|
| *C08L 91/00* | (2006.01) |
| *C08K 3/22* | (2006.01) |
| *C08L 67/02* | (2006.01) |
| *C08K 5/098* | (2006.01) |
| *C08K 11/00* | (2006.01) |
| *C08L 67/03* | (2006.01) |
| *C08K 5/20* | (2006.01) |
| *C08K 5/3445* | (2006.01) |
| *B29C 49/00* | (2006.01) |
| *B29C 49/06* | (2006.01) |
| *B29K 67/00* | (2006.01) |
| *B29K 105/00* | (2006.01) |
| *B29L 31/00* | (2006.01) |

(52) U.S. Cl.
CPC .......... *C08L 91/00* (2013.01); *B29C 49/0005* (2013.01); *C08K 3/22* (2013.01); *C08K 5/098* (2013.01); *C08K 5/20* (2013.01); *C08K 5/3445* (2013.01); *C08K 11/00* (2013.01); *C08L 67/02* (2013.01); *C08L 67/03* (2013.01); *B29C 49/06* (2013.01); *B29K 2067/003* (2013.01); *B29K 2105/0014* (2013.01); *B29K 2995/0053* (2013.01); *B29L 2031/7158* (2013.01); *C08K 2003/2241* (2013.01); *C08K 2201/012* (2013.01); *C08L 2201/08* (2013.01); *C08L 2203/10* (2013.01); *C08L 2203/16* (2013.01)

(58) Field of Classification Search
CPC .......... C08L 91/00; C08L 67/02; C08K 3/22; C08K 2003/2241
See application file for complete search history.

(56) References Cited

U.S. PATENT DOCUMENTS

| | | | |
|---|---|---|---|
| 7,919,159 B2 | 4/2011 | Liu et al. | |
| 8,871,846 B2 | 10/2014 | Fava | |
| 9,593,239 B2 * | 3/2017 | Knudsen | ........... C08L 67/03 |
| 2018/0179362 A1* | 6/2018 | Ferrari | ........... C08K 5/3445 |
| 2018/0305540 A1* | 10/2018 | Ferrari | ........... C08K 5/3445 |

FOREIGN PATENT DOCUMENTS

| | | |
|---|---|---|
| EP | 2386598 A1 | 11/2011 |
| WO | 2013/151926 A1 | 10/2013 |

* cited by examiner

*Primary Examiner* — Vickey Nerangis
(74) *Attorney, Agent, or Firm* — Edwin A. Sisson, Attorney at Law, LLC; Jeffrey J. Banyas

(57) ABSTRACT

Disclosed herein is an oxygen scavenging composition for containers. The oxygen scavenging composition may comprise at least one polyester component, which is a copolyester containing a metal sulfonate salt group, a transition metal catalyst, and a vegetable oil. The vegetable oil may comprise at least one molecule having a double allylic structure. The copolyester containing a metal sulfonate salt group may comprise at least one acid unit and at least one diol unit. The concentration of the double allylic structures of the vegetable oil in the composition may be greater than 5.0 meq/kg of all of the polyester components. The composition may also be void of or substantially void of a polyamide.

20 Claims, 1 Drawing Sheet

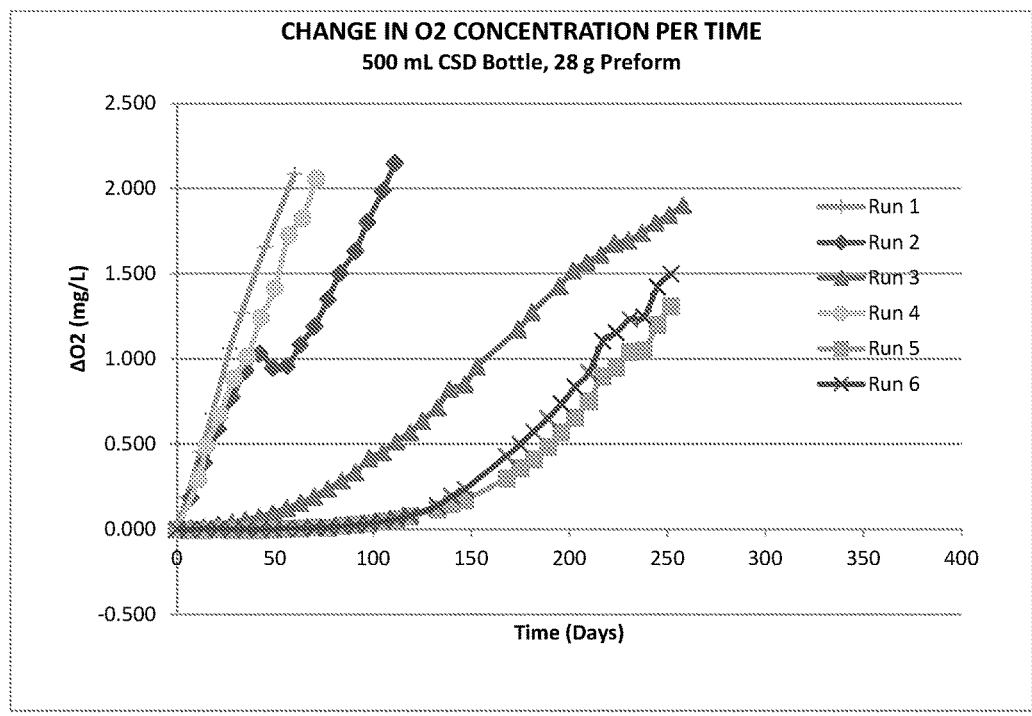

POLYESTER BLENDS WITH IMPROVED OXYGEN SCAVENGING ABILITY

CROSS REFERENCES AND PRIORITIES

This application claims priority from International Application No. PCT/US2016/037028 filed on 10 Jun. 2016, U.S. Provisional Application No. 62/174,593 filed on 12 Jun. 2015, U.S. Provisional Application No. 62/174,603 filed on 12 Jun. 2015, U.S. Provisional Application No. 62/174,631 filed on 12 Jun. 2015, and U.S. Provisional Application No. 62/180,861 filed on 17 Jun. 2015 the teachings of each of which are incorporated herein by reference in their entirety.

BACKGROUND

U.S. Pat. No. 7,919,159 B2 to Liu et al. ("Liu") discloses a composition of a polyester, a partially aromatic polyamide, a cobalt salt and an ionic compatibilizer that is a copolyester containing a metal sulfonate salt. Liu teaches that the use of a transition metal catalyst to promote oxygen scavenging in polyamide containers is well known. Liu further teaches that blends of an ionic compatibilizer (copolyester containing a metal sulfonate salt) and a cobalt salt results in a container having improved gas barrier properties, improved haze and reduced yellowness. Liu also teaches that blends of polyesters and polyamides suffer from issues of haze and yellowness.

U.S. Pat. No. 8,871,846 B2 to Fava ("Fava") discloses a composition of a polyester, a polyamide, a transition metal catalyst and an inert organic compound selected from the group consisting of paraffins, vegetable oils, polyalkylene glycols, esters of polyols, alkoxylates, and mixtures of these substances with linseed oils being an example of such a vegetable oil. Fava discloses that the use of an inert organic compound, which preferably is liquid at ambient temperature, in transition metal-based polyester/polyamide compositions for the forming of articles, e.g. packaging materials for personal care, medical pharmaceutical, household, industrial, food and beverage plastic products, shows a considerable improvement of the oxygen scavenging performance and a considerable reduction or a complete elimination of the oxygen scavenging induction period compared with known transition metal-based polyester/polyamide blends not comprising an inert liquid organic compound.

SUMMARY

Disclosed herein is an oxygen scavenging composition for containers which may comprise: at least one polyester component which may be a copolyester containing a metal sulfonate salt group, a transition metal catalyst, and a vegetable oil comprising at least one molecule having a double allylic structure, wherein the copolyester containing a metal sulfonate salt group may comprise at least one acid unit and at least one diol unit, the concentration of the double allylic structures of the vegetable oil in the composition may be greater than 5.0 meq/kg of all of the polyester components, and the composition may be substantially void of a polyamide.

It is further disclosed that the metal sulfonate salt group may be a metal sulfoisophthalate derived from a metal salt of 5-sulfoisophthalic acid, its dimethyl ester or its glycol ester. It is further disclosed that the metal salt of 5-sulfoisophthalic acid, its dimethyl ester or its glycol ester may comprise a metal ion selected from the group consisting of $Na^+$, $Li^+$, $K^+$, $Zn^{2+}$, $Mn^{2+}$, $Co^{2+}$ and $Ca^{2+}$. It is further disclosed that the metal sulfonate salt group is preferably present in a range selected from the group consisting of 0.01 to 10.0 mole percent, 0.01 to 2.0 mole percent, 0.05 to 1.1 mole percent, 0.10 to 0.74 mole percent and 0.10 to 0.6 mole percent based upon the total moles of acid units in all of the polyester components.

It is further disclosed that the transition metal catalyst may be a compound containing at least one cobalt atom in a positive oxidation state. It is further disclosed that the transition metal catalyst is preferably a salt containing at least one cobalt atom in a positive oxidation state. It is further disclosed that the transition metal catalyst is preferably added to the composition at a level in a range selected from the group of between 10 and 600 ppm, between 20 and 400 ppm and between 40 and 200 ppm of metal relative to the total amount of the polyester components and vegetable oil present in the composition.

It is further disclosed that the vegetable oil may be selected from the group consisting of flax seed oil, linseed oil, evening primrose oil, borage oil, sunflower oil, soybean oil, grapeseed oil, corn oil, cotton seed oil, rice bran oil, canola oil and peanut oil. It is further disclosed that the composition may have a concentration of the double allylic structures of the vegetable oil in the composition is greater than 7.0 meq/kg of all of the polyester components. It is further disclosed that the composition may have a concentration of the double allylic structures of the vegetable oil in the composition is greater than 9.0 meq/kg of all of the polyester components. It is further disclosed that the composition may have a concentration of the double allylic structures of the vegetable oil in the composition is greater than 14.0 meq/kg of all of the polyester components.

It is further disclosed that the composition may be void of a polyamide.

It is further disclosed that the composition may further comprise $TiO_2$. It is further disclosed that the $TiO_2$ may be present in the composition at a level in a range selected from the group consisting of between 0.1 and 15% by weight of the composition, between 0.1 and 10% by weight of the composition, between 0.1 and 5% by weight of the composition and between 0.1 and 2% by weight of the composition.

Also disclosed herein is a preform manufactured from said compositions. Also disclosed herein is a biaxially oriented container manufactured from said preform. Also disclosed herein is a film manufactured from said compositions. Also disclosed herein is a sheet manufactured from said compositions.

Also disclosed herein is an oxygen scavenging composition for containers which may comprise at least one polyester component, a transition metal catalyst, a vegetable oil comprising at least one molecule having a double allylic structure, and $TiO_2$, wherein the concentration of the double allylic structures of the vegetable oil in the composition may be greater than 5.0 meq/kg of all of the polyester components, and the composition may be substantially void of a polyamide.

It is further disclosed that the transition metal catalyst may be a compound containing at least one cobalt atom in a positive oxidation state. It is further disclosed that the transition metal catalyst may be a salt containing at least one cobalt atom in a positive oxidation state. It is further disclosed that the transition metal catalyst may be added to the composition at a level in a range selected from the group of between 10 and 600 ppm, between 20 and 400 ppm and between 40 and 200 ppm of metal relative to the total amount of the polyester components and vegetable oil present in the composition.

It is further disclosed that the vegetable oil may be selected from the group consisting of flax seed oil, linseed oil, evening primrose oil, borage oil, sunflower oil, soybean oil, grapeseed oil, corn oil, cotton seed oil, rice bran oil, canola oil and peanut oil.

It is further disclosed that the concentration of the double allylic structures of the vegetable oil in the composition may be greater than 7.0 meq/kg of all of the polyester components. It is further disclosed that the concentration of the double allylic structures of the vegetable oil in the composition may be greater than 9.0 meq/kg of all of the polyester components. It is further disclosed that the concentration of the double allylic structures of the vegetable oil in the composition may be greater than 14.0 meq/kg of all of the polyester components.

It is further disclosed that the composition may be void of a polyamide.

It is further disclosed that the $TiO_2$ may be present in the composition at a level in a range selected from the group consisting of between 0.1 and 15% by weight of the composition, between 0.1 and 10% by weight of the composition, between 0.1 and 5% by weight of the composition and between 0.1 and 2% by weight of the composition.

Also disclosed herein is a preform manufactured from said compositions. Also disclosed herein is a biaxially oriented container manufactured from said preform. Also disclosed herein is a film manufactured from said compositions. Also disclosed herein is a sheet manufactured from said compositions.

BRIEF DESCRIPTION OF FIGURES

FIG. 1 is a graph of oxygen ingress data of the experimental runs 1 through 6 reported herein.

DETAILED DESCRIPTION

The addition of a transition metal catalyst, specifically a cobalt compound and more specifically a cobalt salt, to blends of polyesters and polyamides to create an active oxygen scavenging system with the polyamide reacting with the oxygen is well known in the art. The addition of vegetable oils to polyester/polyamide compositions for preforms and containers for initiating oxygen scavenging is also known in the art, see for example U.S. Pat. No. 8,871,846 B2 to Fava ("Fava").

Many vegetable oils are known to contain at least one molecule having a double allylic structure. One type of double allylic structure is a mono Diallylic having the general structure:

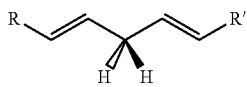

Mono Diallylic structures are found in, for instance, linoleic acid, which is a common component of many vegetable oils. Another type of double allylic structure is a bis Diallylic having the general structure:

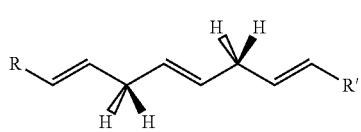

Bis Diallylic structures are found in, for instance, linolenic acid, which is a common component of several vegetable oils. What the inventors have found is that the vegetable oil can be an oxygen scavenger in its own right when the concentration of vegetable oil in the composition is above a critical threshold. The critical threshold is considered to be the level at which the vegetable oil is no longer completely solubilized in the polymer. Without wishing to be bound by any theory, it is believed that, if all of the vegetable oil is solubilized in the host polymer, there are no reactive sites available for scavenging oxygen. However, if the vegetable oil is added at a concentration such that not all of the vegetable oil is solubilized in the polymer, the vegetable oil will form reactive domains in the composition. While the solubility of the vegetable oil in the polymer will vary slightly depending on the type of vegetable oil used, in general the inventors have found that oxygen scavenging occurs when the vegetable oil is present in the composition at a level selected from the group consisting of greater than 0.6% by weight relative to the total weight of the polyester components, the transition metal catalyst and the vegetable oil, greater than 0.5% by weight relative to the total weight of the polyester components, the transition metal catalyst and the vegetable oil, greater than 0.4% by weight relative to the total weight of the polyester components, the transition metal catalyst and the vegetable oil and greater than 0.3% by weight relative to the total weight of the polyester components, the transition metal catalyst and the vegetable oil. Thus, the composition results in a preform, container, sheet or film having active oxygen scavenging characteristics when substantially void of a polyamide.

Further, the inventors have found that the amount of time that the composition will scavenge oxygen is dependent upon the milliequivalents per kilogram (meq/kg) of double allylic structures from the vegetable oil in the final composition. The milliequivalents per kilogram (meq/kg) of double allylic structures is determined by first calculating the mmole/kg of molecules containing mono Diallylic structures and the mmole/kg of molecules containing bis Diallylic structures in the respective vegetable oil. For example, where the vegetable oil contains 15% by weight linoleic acid having a molecular weight of 280.45, the mmole/kg of mono Diallylic structures in the vegetable oil is 534.85, $$\left(\left(\frac{15}{280.45}\right) \times 10{,}000 = 534.85\right).$$

Where the vegetable oil also contains 54% by weight linolenic acid having a molecular weight of 278.43, the mmole/kg of bis Diallylic structures in the vegetable oil is 1,939.45, $$\left(\left(\frac{54}{278.43}\right) \times 10{,}000 = 1{,}939.45\right).$$

Once the mmole/kg of mono Diallylic structures and bis Diallylic structures in the vegetable oil is known, this value can be used to calculate the meq/kg of double allylic structures in the vegetable oil by adding the mmole/kg of mono Diallylic structures to the mmole/kg of bis Diallylic structures multiplied by two. The mmole/kg of bis Diallylic structures is multiplied by two to take into account the fact that the bis Diallylic structures contain two reactive sites. For example, a vegetable oil containing 15% by weight linoleic acid and 54% by weight linolenic acid contains 4,413.75 meq/kg of double allylic structures, (534.85+(1,939.45×2)=4,413.75). Once the meq/kg of double allylic structures in the vegetable oil is known, this value can be used to calculate the milliequivalents per kilogram of polyester components in the final composition by dividing this number by the weight of the polyester components in the composition.

To ensure acceptable oxygen scavenging performance and longevity, it is preferred that the vegetable oil have a concentration of double allylic structures greater than 1000 meq/kg, greater than 1500 meq/kg, greater than 2000 meq/kg, or greater than 2300 meq/kg, where the concentration is a measure of the milliequivalents of the double allylic structure relative to the weight of the vegetable oil. Accordingly, this discovery is to a composition for containers comprising at least one polyester component which is a copolyester containing a metal sulfonate salt group, a transition metal catalyst, and a vegetable oil comprising at least one molecule having a double allylic structure, wherein the copolyester containing a metal sulfonate salt group comprises at least one acid unit and at least one diol unit, the concentration of the double allylic structures of the vegetable oil in the composition is greater than 5.0 meq/kg of all of the polyester components, greater than 7.0 meq/kg of all of the polyester components, greater than 9.0 meq/kg of all of the polyester components, or greater than 14.0 meq/kg of all of the polyester components and the composition is void of a polyamide or substantially void of a polyamide.

As used herein and in the claims, void of a polyamide means that there is no polyamide present in the composition. As used herein and in the claims, substantially void of a polyamide means that only trace amounts of a polyamide, such as less than 0.05% by weight polyamide, are present in the composition. One in the industry would not expect this amount of polyamide to have any impact on the oxygen barrier performance of the resulting composition. One might find this amount of polyamide when using a post-consumer, recycled polyester as at least a portion of the polyester component in the composition.

Also disclosed in this specification is a preform made from the polyester composition of at least one polyester component which is a copolyester containing a metal sulfonate salt group, a transition metal catalyst, and a vegetable oil comprising at least one molecule having a double allylic structure. As explained in detail herein, the metal sulfonate salt group has been found to dramatically increase the amount of oxygen scavenging of the vegetable oil.

The polyester component is a polyester formed by the reaction product of at least one dicarboxylic acid or its ester derivative and at least one diol. One useful polyester is a polyester with more than 85% of its acid units being derived from terephthalic acid.

One example of a polyester component is a copolyester containing a metal sulfonate salt group which can be prepared by polymerization procedures well-known in the art. The copolyester containing a metal sulfonate salt group may be prepared by melt phase polymerization involving the reaction of at least one diol unit with at least one dicarboxylic acid or its corresponding ester (the at least one acid unit) and a metal salt of 5-sulfoisophthalic acid or its corresponding ester.

In general, the copolyester containing a metal sulfonate salt group may be prepared, for example, by melt phase polymerization involving the reaction of at least one diol with at least one dicarboxylic acid or its corresponding ester and a metal salt of 5-sulfoisophthalic acid or its corresponding ester. Various copolymers resulting from use of multiple diols and dicarboxylic acids may also be used. Polymers containing repeating units of only one chemical composition are homopolymers. Polymers with two or more chemically different repeat units in the same macromolecule are termed copolymers. The diversity of the repeat units depends on the number of different types of monomers present in the initial polymerization reaction. In the case of polyesters, copolymers include reacting one or more diols with a diacid or multiple diacids, and are sometimes referred to as terpolymers. For example, a polyethylene terephthalate copolymer comprised of terephthalic acid, isophthalic acid and the lithium salt of 5-sulfoisophthalic acid is a copolyester.

Suitable dicarboxylic acids include those comprising from about 4 to about 40 carbon atoms. Specific dicarboxylic acids include, but are not limited to, terephthalic acid, isophthalic acid, naphthalene 2,6-dicarboxylic acid, cyclohexanedicarboxylic acid, cyclohexanediacetic acid, diphenyl-4,4'-dicarboxylic acid, 1,3-phenylenedioxydiacetic acid, 1,2-phenylenedioxydiacetic acid, 1,4-phenylenedioxydiacetic acid, succinic acid, glutaric acid, adipic acid, azelaic acid, sebacic acid, furan-2,5-dicarboxylic acid and the like. Specific esters include, but are not limited to, phthalic esters and naphthalic diesters. A useful polyester is a polyester with more than 85% of its acid units being derived from terephthalic acid.

These acids or esters may be reacted with an aliphatic diol preferably having from about 2 to about 24 carbon atoms, a cycloaliphatic diol having from about 7 to about 24 carbon atoms, an aromatic diol having from about 6 to about 24 carbon atoms, or a glycol ether having from 4 to 24 carbon atoms. Suitable diols and glycol ethers include, but are not limited to, ethylene glycol, 1,4-butanediol, trimethylene glycol, 1,6-hexanediol, 1,4-cyclohexanedimethanol, diethylene glycol, resorcinol, 1,3-propanediol, neophenthyl glycol, isosorbide, 2,2,4,4-tetramethyl-1,3-cyclobutanediol (TMCD) and hydroquinone.

Polyfunctional comonomers can also be used, typically in amounts of from about 0.01 to about 3 mole percent. Suitable comonomers include, but are not limited to, trimellitic anhydride, trimethylolpropane, pyromellitic dianhydride (PMDA), and pentaerythritol. Polyester-forming polyacids or polyols can also be used. Blends of polyesters and copolyesters may also be useful in the present invention.

It is also well known that di-ethylene glycol is formed in-situ in the manufacture of polyesters having ethylene glycol as their starting diol and that about 2 to 3 percent of the total moles of the final diol units in the polyester will be diethylene glycol. Therefore, the composition may have 97 mole percent of its diol units as ethylene glycol and 3 mole percent of its diol units as di-ethylene glycol.

The esterification or polycondensation reaction of the carboxylic acids or their esters with the diol(s) typically takes place in the presence of a catalyst. Suitable catalysts include, but are not limited to, antimony oxide, antimony triacetate, antimony ethylene glycolate, organomagnesium, tin oxide, titanium alkoxides, dibutyl tin dilaurate, and germanium oxide. These catalysts may be used in combination with zinc, manganese, or magnesium acetates or benzoates. Catalysts comprising antimony are preferred.

The metal sulfonate salt group is preferably a metal sulfoisophthalate derived from a metal salt of 5-sulfoisophthalic acid its dimethyl ester or its glycol ester. The metal salt of 5-sulfoisophthalic acid comprises a metal ion selected from the group consisting of $Na^+$, $Li^+$, $K^+$, $Zn^{2+}$, $Mn^{2+}$, $Co^{2+}$, $Ca^{2+}$ and the like. The copolyester containing the metal sulfonate salt group is made by copolymerizing the metal sulfonate into the polymer chain.

The importance of the metal sulfonate salt can be seen in FIG. 1. As shown in FIG. 1, compositions made without the metal sulfonate salt exhibited minimal oxygen scavenging and often times variable and unpredictable oxygen scavenging. Surprisingly, the presence of the metal sulfonate salt, even at very low levels, increased the oxygen scavenging performance of the vegetable oil and eliminated most, if not all of the variations and unpredictability.

One suitable copolyester containing a metal sulfonate salt group is a copolymer of polyethylene terephthalate (PET) modified with a metal sulfoisophthalate derived from the di-ester or di-carboxylic acid of a metal sulfoisophthalate in the approximately 1:1 stoichiometric reaction of acids, or their di-esters, with ethylene glycol. Specific copolymers and terpolymers also include crystallizable and non-crystallizable polyesters comprising a metal sulfoisophthalate in combination with isophthalic acid or its diester, 2,6 naphthalate dicarboxylic acid or its diester, and/or cyclohexane dimethanol.

The amount of metal sulfonate salt group in the polyester component, in particular, metal sulfoisophthalate (derived from a metal salt of 5-sulfoisophthalic acid), is preferably in the range of about 0.01 to 10.0 mole percent based on the total acid units in all of the polyester components of the composition, with an optimal amount being in the range of about 0.01 to about 2.0 mole percent based on the total acid units in all of the polyester components of the composition, with the range of about 0.05 to about 1.1 mole percent based on the total acid units in all of the polyester components of the composition being more optimal, and about 0.10 to about 0.74 mole percent based on the total acid units in all of the polyester components of the composition being even better yet, with the range of about 0.10 to about 0.6 mole percent based on the total acid units in all of the polyester components of the composition being the most optimal range. The amount of metal sulfonate salt group in the composition is calculated on the basis of the moles of the total acid groups in all of the polyester components present in the composition.

One preferred metal sulfoisophthalate is derived from 5-lithiumsulfoisophthalic acid. The molecular structure of 5-lithiumsulfoisophthalic acid is:

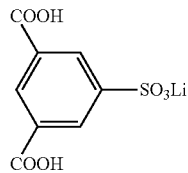

5-Lithiumsulfoisophthalic Acid (LiSIPA) or Sulfonic Acid Lithium Salt Modified Isophthalic Acid As is evident from the above diagram, the 5-lithiumsulfoisophthalic acid is a lithium sulfonate and comprises lithium sulfoisophthalate. The lithium sulfoisophthalate refers to the compound as it is appears incorporated into the polymer chain. This is also known as the repeating unit of 5-lithiumsulfoisophthalic acid. Lithium sulfoisophthalate therefore is the 5-lithiumsulfoisophthalic acid less one water molecule, with one hydroxyl group removed from one of the carboxyl end groups and a hydrogen removed from the other carboxyl end group. This molecule is then attached to one or more monomers ($R_1$ and $R_2$) in the polymer backbone.

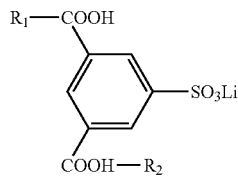

The metal sulfonate salt group, in this case lithium sulfoisophthalate, is the molecule between the two R groups. Again, R could be the same monomer, in the case of PET, the R's are likely the same being the ethylene glycol moiety as reacted into the polymer chain.

Typical levels of the metal sulfonate salt group in a polyester polymer range from 0.01 mole percent to 15 mole percent with respect to the total number of moles of the respective acid unit. For example, a typical homopolymer polyester has 100 mole percent terephthalic acid units and 100 mole percent glycol units (ethylene glycol and di-ethylene glycol). A polyester containing 5 mole percent of a metal salt of sulfoisophthalic acid co-monomer would be derived from 95 moles of terephthalic acid, 5 moles of metal sulfonate (such as 5-lithiumsulfoisophthalic acid) and 100 moles of ethylene glycol. Similarly, it may be advantageous to add another co-monomer such as isophthalic acid. For example, a 2 mole percent isophthalate polymer would contain 93 moles terephthalic acid, 2 moles of isophthalic acid, 5 moles of metal sulfonate (such as 5-lithiumsulfoisophthalic acid) and 100 moles ethylene glycol to make 100 moles of the polymer repeat unit.

Examples of copolyesters containing a metal sulfonate salt group employed in the present invention are those prepared by virtually any polycondensation polymerization procedure. The traditional techniques can be divided into the ester, acid, and modified processes. In the ester process, the dimethyl ester of the dicarboxylic acid or acids is reacted with the diol or diols in the presence of heat and the methanol removed yielding the bis-hydroxyethyl ester of the acids. The bis-hydroxyethyl ester is then polymerized in its liquid form by subjecting the material to vacuum and heat to remove the glycols and increase the molecular weight. A typical process for the object polymer would start with these ratios: 98 moles of dimethyl terephthalate, 2 moles of dimethyl lithium salt of sulfoisophthalate and 220 moles of diol, typically ethylene glycol. Of the 220 moles of diol, 120 are excess which are removed during processing. It should be noted that it is possible to obtain the sulfonated co-monomer in either its bis-(hydroxyethyl) or dimethyl ester form.

For clarification, the phrase copolymerized with at least X percent of a specific acid means that the compound is considered as part of the acid group of the polymer, such as terephthalic or isophthalic acid. It provides the reference to determine how many moles of the compound to use. The phrase does not mean that the compound must be added to the process as an acid. For example, 5-lithiumsulfoisophthalic acid could be copolymerized into polyethylene terephthalate as the acid, with two carboxylic end groups, the dimethyl ester of the carboxylic acid, or the bishydroxy ester of the dimethyl ester or even very low molecular weight oligomers of a glycol acid polymer where the acid units are at least in part, the sulfoisophthalate salt.

The phrase "copolymerized salt of the acid" should not limit the claim to only using the acid form, but should be read to mean the compound is one of the acid groups in the polymer.

The phrase "copolymerized with" means that the compound has been chemically reacted with the polymer, such as in the polymer chain or as a pendant group. For example, a polyester copolymerized with lithium sulfoisophthalate, or modified by copolymerizing at least 0.01 mole percent 5-lithiumsulfoisophthalic acid into the polyester, means that the lithium sulfoisophthalate is bonded to the polymer, including bound into the polymer chain, with at least one chemical bond. The phrases are indifferent to how the material is incorporated into the polymer. A polyester copolymerized with lithium sulfoisophthalate, or modified by copolymerizing at least 0.01 mole percent lithium sulfoisophthalate into the polyester refers to a polyester containing the lithium sulfoisophthalate whether that lithium sulfoisophthalate was incorporated using but not limited to 5-lithiumsulfoisophthalic acid, lithium sulfobenzoic acid, the dimethyl ester of 5-lithiumsulfoisophthalic acid, the methyl ester of lithium sulfobenzoic acid, the di-alcohol of lithium sulfoisophthalate, the lithium sulfohydroxy benzene, the lithium salt of hydroxy benzene sulfonic acid, or oligomers or polymers containing the lithium sulfoisophthalate.

The phrases "and derivatives" and "and its derivatives" refer to the various functionalized forms of the metal sulfonate salt which can be copolymerized into the polymer. For example, lithium sulfoisophthalate "and its derivatives" refers collectively and is not limited to 5-lithiumsulfoisophthalic acid, the dimethyl ester of 5-lithiumsulfoisophthalic acid, the bis-hydroxyethyl ester of 5-lithiumsulfoisophthalic acid, the di-alcohol of lithium sulfoisophthalate, low molecular weight oligomers, and high I.V. polymers containing lithium sulfoisophthalate in the polymer chain.

The same nomenclature applies to the glycol or diol.

In the acid process, the starting materials are the dicarboxylic acids, with water being the primary by-product. The charge ratio in a typical acid process is 98 moles terephthalic acid, 2 moles of a metal salt of sulfoisophthalic acid (e.g. 5-lithiumsulfoisophthalic acid—LiSIPA), and 120 moles of diols, typical ethylene glycol. After reaction of the diols with the acids, the material is subjected to the same polymerization process conditions as the ester process.

The modified processes are variations of either process: combining the intermediary product at certain steps. One example is to pre-polymerize the raw materials without the metal salt of sulfoisophthalic acid to a low molecular weight. In the case of the examples described below, the molecular weight of the low molecular weight polyester was typically in the range 0.096 to 0.103 dl/g (intrinsic viscosity), having a carboxyl end group number ranging from 586 to 1740 equivalents per 1,000,000 grams of polymer. The molecular weight could be easily varied without undue experimentation as it has been for many years by those of ordinary skill in the art when optimizing the addition point for their additives.

Another example of a variation is to use the acid process with just terephthalic acid to produce its low molecular weight intermediate and the ester process used to produce the bis-hydroxyethyl ester of the homopolymer sulfonated polyester. These two intermediates are then combined and polymerized to a copolymer. Another variation is to add the finished modified polymer to the melt reactor and let the melt process depolymerise the modified polymer and then form a copolymer.

The copolyesters of this invention may also contain small amounts of phosphorous compounds, such as phosphates. Also, small amounts of other polymers such as polyolefins can be tolerated in the continuous matrix.

After completion of the melt phase polymerization, the polymer is either made into a form such as a film or part or stranded and cut into smaller chips, such as pellets. The polymer is usually then crystallized and subjected to a solid phase (solid state) polymerization (SSP) step to achieve the intrinsic viscosity necessary for the manufacture of certain articles such as bottles. The crystallization and polymerization can be performed in a tumbler dryer reactor in a batch-type system. The solid phase polymerization can continue in the same tumble dryer where the polymer is subjected to high vacuum to extract the polymerization by-products.

Alternatively, the crystallization and polymerization can be accomplished in a continuous solid state polymerization process whereby the polymer flows from one vessel to another after its predetermined treatment in each vessel. The crystallization conditions are relative to the polymer's crystallization and sticking tendencies. However, preferable temperatures are from about 100° C. to about 235° C. In the case of crystallisable polyesters, the solid phase polymerization conditions are generally 10° C. below the melt point of the polymer. In the case of non-crystallisable polyesters, the solid phase polymerization temperature is generally about 10° C. below temperature where the polymer begins sticking to itself. While traditional solid phase polymerization temperatures for crystallisable polymers range from about 200° C. to about 232° C., many operations are from about 215° C. to about 232° C. Those skilled in the art will realize that the optimum solid phase polymerization temperature is polymer specific and depends upon the type and amount of copolymers in the product. However, determination of the optimum solid phase polymerization conditions is frequently done in industry and can be easily done without undue experimentation.

The solid phase polymerization may be carried out for a time sufficient to raise the intrinsic viscosity to the desired level, which will depend upon the application. For a typical bottle application, the preferred intrinsic viscosity (I.V.) is from about 0.65 to about 1.0 deciliter/gram, as determined by the method described in the methods section. The time required to reach this I.V. from about 8 to about 21 hours.

Vegetable oils of the present invention may be selected from the group consisting of flax seed oil, linseed oil, evening primrose oil, borage oil, sunflower oil, soybean oil, grapeseed oil, corn oil, cotton seed oil, rice bran oil, canola oil and peanut oil. Preferably the vegetable oil comprises at least one molecule having a double allylic structure. One type of double allylic structure is a mono Diallylic having the general structure

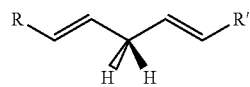

Mono Diallylic structures are found in, for instance, linoleic acid, which is a common component of many vegetable oils. Another type of double allylic structure is a bis Diallylic having the general structure

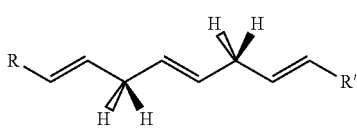

Bis Diallylic structures are found in, for instance, linolenic acid, which is a common component of several vegetable oils.

Examples of molecules having a double allylic structures found in many vegetable oils include linoleic acid and gamma linolenic acid. Linoleic acid has the general structure of:

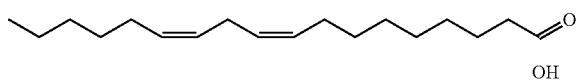

Gamma linolenic acid has the general structure of:

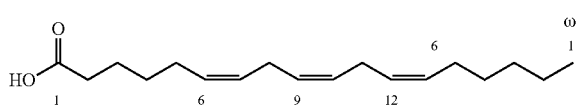 [SMILES: CCCCC/C=C\C/C=C\C/C=C\CCCCC(=O)O]

One especially preferred vegetable oil is flax seed oil. Flax seed oil is raw, cold pressed oil derived from the seed from the plant *Linum usitatissimum*. Flax seed oil is a poly-unsaturated ester having a mixture of fatty acids, primarily in the form of triacylglycerides, with each triacylglyceride comprised of three acids selected from the group consisting of triply saturated alpha-linolenic acid, saturated acid palmitic acid, saturated acid stearic acid, monosaturated oleic acid, and doubly saturated linoleic acid. The poly-unsaturated ester of flax seed oil has the general structure of:

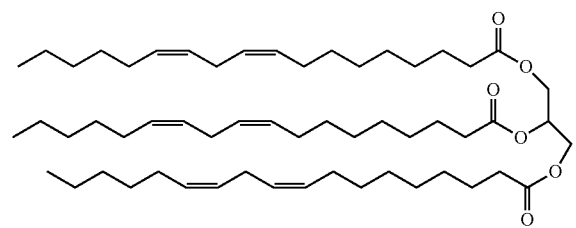 [SMILES: CCCCC/C=C\C/C=C\CCCCCCCC(=O)OCC(COC(=O)CCCCCCC/C=C\C/C=C\CCCCC)OC(=O)CCCCCCC/C=C\C/C=C\CCCCC]

and isomers thereof.

Flax seed oil is well known for having the alpha-linolenic acid as its largest constituent. Flax seed oil is available as the cold pressed oil (known simply as flax seed oil) or as a chemically treated and heated oil derived from the flax seed (known as linseed oil). The cold pressed flax seed oil is preferred over the chemically treated and heated linseed oil as it is generally regarded as safe for human consumption.

Vegetable oil is used as an oxygen scavenger in the compositions disclosed herein. Preferably, the vegetable oil is added at a level such that the concentration of double allylic structures of the vegetable oil in the composition is greater than 5.0 meq/kg of the total polyester components, greater than 7.0 meq/kg of the total polyester components, greater than 9.0 meq/kg of the total polyester components, or greater than 14.0 meq/kg of the polyester components. The vegetable oil can be added during the polymerization process of the copolyester containing a metal sulfonate salt group but is preferably added after the polymerization process, such as at the extruder or during injection molding.

What has been found is that, when the vegetable oil is added to the composition at a level above a critical threshold, the vegetable oil will act as an oxygen scavenger without the need for an additional oxygen scavenging polymer, such as a polyamide.

In one embodiment, oxygen scavenging may be assisted by the use of a transition metal catalyst. One preferred transition metal catalyst is a compound containing at least one cobalt atom in a positive oxidation state. A more preferred transition metal catalyst is a salt containing at least one cobalt atom in a positive oxidation state.

One preferred transition metal catalyst is a cobalt salt. Preferred cobalt salts include cobalt chloride, cobalt acetate, cobalt proprionate, cobalt stearate, cobalt octoate, cobalt neodecanoate, cobalt oleate, cobalt linoleate, cobalt salts of fatty acids, cobalt salts of short chained fatty acids, cobalt salts of medium chained fatty acids, cobalt salts of long chained fatty acids, cobalt carbonate and combinations thereof.

The preferred cobalt salt is an organic cobalt salt with the inorganic cobalt salts which can be solubilized in the polyester being less preferred.

The cobalt atom of the cobalt compound may also exist in the anion of the compound, such as lithium cobaltate (LiCoO$_2$) and potassium tris(oxalto)cobaltate(III). The cobaltate may also be formed in situ by the reaction of the cobalt atom in the presence of the polyester's carboxylic acids in the presence of an alkali metal base.

The cobalt compound may also be a cobalt complex such as cobalt glycolate.

The transition metal catalyst is preferably in a range of between 10 and 600 ppm of metal relative to the total amount of the polyester components and vegetable oil present in the composition with a level in the range of between 20 and 400 ppm relative to the total amount of the polyester components and vegetable oil present in the composition being more preferred and a level in the range of between 40 and 200 ppm relative to the total amount of the polyester components and vegetable oil present in the composition being most preferred.

The transition metal catalyst may be added during the polymerization process of the copolyester containing a metal sulfonate salt group or it may be added after the polymerization process, such as at the extruder or during injection molding.

In some embodiments, the polyester may be polymerized in the presence of a phosphorous compound, such as polyphosphoric acid, phosphoric acid, or triethyl phosphate, for example. When the polyester is polymerized in the presence of a phosphorous compound, it is preferred to keep the molar ratio of the amount of moles of phosphorous to the moles of cobalt ions in a range selected from the group consisting of 0 to 1.7, 0 to 1.2, 0 to 1.1, 0 to 1.0, 0 to 0.8, and 0 to 0.6.

The components of the composition (the polyester component, the transition metal catalyst and vegetable oil) are often melt blended in an injection molding extruder to make a film, sheet or preform. When the composition is injection molded to make a preform, the preform can then be biaxially stretched, such by reheat blow molding, to form a biaxially oriented container.

The compositions disclosed herein may include additional additives including colorants, pigments, fillers, acid scavengers, processing aids, coupling agents, lubricants, stearates, blowing agents, polyhydric alcohols, nucleating agents, antioxidants, antistatic agents, UV absorbers, slip agents, anti-fogging agents, anti-condensation agents, suspension stabilizers, anti-blocking agents, waxes and mixtures thereof. These additives are added at levels not inconsistent with the end use to make a commercially acceptable container. Generally, these additives are added at a level less than 5% by weight of the composition. For example, one preferred pigment is $TiO_2$ which, when present, is preferably added to the composition at a level in a range selected from the group consisting of between 0.1 and 15% by weight of the composition, between 0.1 and 10% by weight of the composition, between 0.1 and 5% by weight of the composition and between 0.1 and 2% by weight of the composition.

EXAMPLES

The ability of a vegetable oil to scavenge oxygen in the absence of a polyamide was tested according to the following procedures. The PET resins (PET1, PET2, SIPA1) were dried (177° C., 5 hours, desiccated air) using a ConAir D175 Desiccant Carousel, then cooled and held at 135° C. in the dryer until injection molding. The experimental compositions for injection molding were prepared by mixing the various PET/SIPA resins and vegetable oils together in a metal can. Compositions comprising at least one polyester component, a transition metal catalyst and a vegetable oil were blended in an Arburg 420C injection molding extruder and molded into preforms. The compositions were injection molded into 28 gram preforms having a 4 mm wall thickness. These preforms were then blown into 500 mL bottles. Unless otherwise indicated, the materials used in the experimental compositions include:

PET1=8006C-Co PET resin containing 102 ppm cobalt from cobalt neodecanoate available from M&G Polymers USA, LLC, Apple Grove, W. Va., USA PET2=8006C PET resin available from M&G Polymers USA, LLC, Apple Grove, W. Va., USA SIPA1=Poliprotect SN resin comprising 0.33 mole % LiSIPA and containing 138 ppm cobalt from cobalt neodecanoate available from M&G Polymers USA, LLC, Apple Grove, W. Va., USA Co=Cobalt Neodecanoate, 20.5% Co, Product No. 1354 available from Shepherd Chemical, Norwood, Ohio, USA FSO1=Conventional Grade Flax Oil available from TA Foods, Yorkton, Saskatchewan, Canada EPR=Bulk Evening Primrose Oil—Organic 9% GLA available from Jedwards International, Braintree, Mass., USA GSO=Bulk Grape Seed Oil—Virgin Organic available from Jedwards International, Braintree, Mass., USA SBO=Bulk Soybean Oil—Organic available from Jedwards International, Braintree, Mass., USA SFO=Bulk Sunflower Oil—Organic available from Jedwards International, Braintree, Mass., USA Unless otherwise indicated, the 28 g preforms were injection molded using the following injection molding conditions:

IM1=Injection molded using an Arburg 420C injection molding machine having a 30 mm diameter screw having a 23.1 length/diameter ratio rotating at 102 rpm. 525° F. (274° C.) injection molding temperature, 2000 psi back pressure, 21 second cycle per preform, 8 seconds of cooling in the mold subject to 32° F. (0° C.) chiller water.

IM2=Injection molded using an Arburg 420C injection molding machine having a 30 mm diameter screw having a 23.1 length/diameter ratio screw rotating at 102 rpm. 540° F. (282° C.) injection molding temperature, 2000 psi back pressure, 18 second cycle per preform, 5 seconds of cooling in the mold subject to 41° F. (5° C.) chiller water.

Compositions comprising the components listed in Table 1 below were tested. In each run, the specific PET and SIPA components were blended to achieve the reported final SIPA mole %. Runs 1 through 3 utilized PET1 resin. Runs 4 through 6 utilized PET2 resin in combination with SIPA1 resin. The SIPA mole % reported in Table 1 is the measure of the moles of metal sulfonate salt group based upon the total moles of acid units in all of the polyester components in the composition. The amount of cobalt reported in Table 1 is the measure of ppm cobalt from cobalt neodecanoate relative to the total amount of the polyester components and the vegetable oil present in the composition. The weight % of FSO1 reported in Table 1 is the measure of the weight of flax seed oil relative to the total weight of the polyester components, the transition metal catalyst (cobalt salt) and the flax seed oil. The double allylic concentration reported in Table 1 is the milliequivalents of the double allylic structures in FSO1 relative to the total weight of the polyester components (PET and SIPA) in kilograms.

TABLE 1

| Run No. | SIPA (mol %) | Vegetable Oil Type | Vegetable Oil (wt %) | Double Allylic Concentration (meq/kg) | Co (ppm) | Injection Molding Conditions |
|---|---|---|---|---|---|---|
| 1 | 0.0 |      | 0.0  | 0.0  | 100 | IM2 |
| 2 | 0.0 | FSO1 | 0.75 | 32.3 | 100 | IM1 |
| 3 | 0.0 | FSO1 | 0.75 | 32.3 | 100 | IM2 |
| 4 | 0.24 |     | 0.0  | 0.0  | 100 | IM2 |
| 5 | 0.24 | FSO1 | 0.75 | 32.3 | 100 | IM1 |
| 6 | 0.24 | FSO1 | 0.75 | 32.3 | 100 | IM2 |

After blowing the bottles, each bottle was tested for oxygen ingress using a Fibox 4-Trace Fiber Optic Trace Oxygen Meter (Model Oxy-4-Trace-04-006) made by PreSens GmbH (www.presens.de, Regensburg, Germany). The meter reads a sensor dot which has been placed inside the sealed bottle. The principle of the sensor operation is based on the quenching of luminescence caused by the collision between molecular oxygen and luminescent dye molecules in the excited state. The sensor dots and meter were calibrated according to the standards and procedures given by the manufacturer. The amount of dissolved oxygen in the liquid sealed inside each bottle is calculated by the Fibox software.

In a continuously purged nitrogen box, freshly blow molded bottles are conditioned for 18 to 24 hours and then filled with 500 mL of deoxygenated water and carbonated by the addition of citric acid (5.54 g) and sodium bicarbonate (95.81 g) to give the desired degree of carbonation (3.1 volumes of $CO_2$). The bottles have an overflow volume of 534 mL. After filling, a transparent gas-tight plastic insert, which has a Fibox sensor affixed to the interior top of the insert, is fitted into the mount of each bottle. The top exterior of the plastic insert has a threaded hole for the attachment of the fiber optic coupler used to read the Fibox sensor. The filled bottle with gas-tight insert is sealed with a metal retainer cap. The metal cap has an opening to permit reading of the Fibox sensor by the meter.

To take a reading, the bottles are shaken for 10 minutes (Eberbach Reciprocating Shaker, Model 6000) to ensure equilibration between the oxygen dissolved in the liquid and the oxygen in the bottle headspace. The fiber optic cable is attached to the top of the gas-tight plastic bottle insert. The meter reads the sensor dot and calculates the dissolved $O_2$ concentration while the bottle is gently shaken while lying on its side.

An initial baseline oxygen reading is made on each newly filled bottle. The bottles are then aged under low light conditions in a room controlled at 71.6±1° F. (22±0.5° C.) and 43±2% RH. The dissolved $O_2$ concentration readings (ppm $O_2$ mg/L) are taken at regular time intervals until the test is terminated. The change in dissolved ppm $O_2$ mg/L from the baseline ($\Delta O_2$) for each run is reported below in Table 2 with a graph of the change in dissolved ppm $O_2$ mg/L reported in FIG. 1.

TABLE 2

| Days | Run 1 ($\Delta O_2$) | Run 2 ($\Delta O_2$) | Run 3 ($\Delta O_2$) | Run 4 ($\Delta O_2$) | Run 5 ($\Delta O_2$) | Run 6 ($\Delta O_2$) |
|---|---|---|---|---|---|---|
| 0 | 0.000 | 0.000 | 0.000 | 0.000 | 0.000 | 0.000 |
| 5 | 0.188 | | | | | |
| 6 | | | | | -0.004 | -0.002 |
| 7 | | 0.188 | 0.005 | | | |
| 11 | | | | 0.293 | | |
| 12 | 0.458 | | | | | |
| 14 | | 0.394 | 0.015 | | -0.003 | 0.003 |
| 15 | | | | 0.487 | | |
| 18 | 0.679 | | | | | |
| 21 | | 0.588 | 0.026 | | -0.001 | 0.003 |
| 22 | | | | 0.675 | | |
| 27 | 1.062 | | | | | |
| 28 | | 0.775 | 0.040 | | -0.004 | -0.001 |
| 29 | | | | 0.887 | | |
| 33 | 1.272 | | | | | |
| 35 | | 0.929 | 0.056 | | -0.004 | 0.000 |
| 36 | | | | 1.013 | | |
| 40 | 1.503 | | | | | |
| 42 | | 1.030 | 0.073 | | -0.003 | 0.000 |
| 43 | | | | 1.243 | | |
| 45 | 1.659 | | | | | |
| 49 | | 0.948 | 0.097 | | 0.000 | 0.001 |
| 50 | | | | 1.419 | | |
| 55 | | | | | 0.002 | 0.006 |
| 56 | | 0.958 | 0.125 | | | |
| 57 | | | | 1.728 | | |
| 60 | 2.090 | | | | | |
| 63 | | 1.084 | 0.156 | | 0.007 | 0.006 |
| 64 | | | | 1.827 | | |
| 70 | | 1.190 | 0.192 | | 0.014 | 0.009 |
| 71 | | | | 2.058 | | |
| 77 | | 1.351 | 0.239 | | 0.009 | 0.011 |
| 83 | | 1.502 | | | | |
| 84 | | | 0.286 | | 0.022 | 0.018 |
| 91 | | 1.634 | 0.334 | | 0.028 | 0.024 |
| 97 | | 1.802 | | | | |
| 98 | | | 0.419 | | 0.036 | 0.034 |
| 105 | | 1.987 | 0.452 | | 0.046 | 0.045 |
| 111 | | 2.148 | | | | |
| 112 | | | 0.517 | | 0.059 | 0.060 |
| 119 | | | 0.569 | | 0.077 | 0.080 |
| 125 | | | 0.636 | | | |
| 133 | | | 0.716 | | 0.119 | 0.139 |
| 139 | | | 0.824 | | | |
| 140 | | | | | 0.148 | 0.195 |
| 147 | | | 0.851 | | 0.173 | 0.238 |
| 153 | | | 0.956 | | | |
| 168 | | | | | 0.298 | 0.431 |
| 174 | | 1.174 | | | | |
| 175 | | | | | 0.359 | 0.500 |
| 181 | | 1.274 | | | | |
| 182 | | | | | 0.411 | 0.574 |
| 189 | | | | | 0.486 | 0.651 |
| 195 | | 1.428 | | | | |
| 196 | | | | | 0.569 | 0.737 |
| 202 | | 1.520 | | | | |
| 203 | | | | | 0.656 | 0.837 |
| 209 | | 1.564 | | | | |
| 210 | | | | | 0.752 | 0.920 |
| 216 | | 1.612 | | | | |
| 217 | | | | | 0.899 | 1.103 |
| 223 | | 1.677 | | | | |
| 224 | | | | | 0.950 | 1.154 |
| 230 | | 1.695 | | | | |
| 231 | | | | | 1.043 | 1.234 |
| 237 | | 1.739 | | | | |
| 238 | | | | | 1.051 | 1.245 |
| 244 | | 1.800 | | | | |
| 245 | | | | | 1.202 | 1.422 |
| 251 | | 1.843 | | | | |
| 252 | | | | | 1.310 | 1.500 |
| 258 | | 1.901 | | | | |

*Cells without a reported value represent days on which a dissolved oxygen reading was not taken for the run in question.

The results reported in Table 2 above and visually displayed in FIG. 1 show that the composition of at least one polyester which is a copolyester containing a metal sulfonate salt group, cobalt neodecanoate and vegetable oil scavenges oxygen (results in less $O_2$ ingress as indicated by the lower $\Delta O_2$ at comparable reading times) irrespective of cooling conditions and without the need for an additional polyamide component.

Additional oxygen scavenging testing was performed using different vegetable oils. The compositions used in these tests are summarized below in Table 3. In each run, the specific PET and SIPA components were blended to achieve the reported final SIPA mole %. Each run utilized PET2 resin in combination with SIPA1 resin. The SIPA mole % reported in Table 3 is the measure of the moles of metal sulfonate salt group based upon the total moles of acid units in all of the polyester components in the composition. The amount of cobalt reported in Table 3 is the measure of ppm cobalt from cobalt neodecanoate relative to the total amount of the polyester components and the vegetable oil present in the composition. The weight % of the vegetable oil reported in Table 3 is the measure of the weight of vegetable oil relative to the total weight of the polyester components, the transition metal catalyst (cobalt salt) and the vegetable oil. The double allylic concentration reported in Table 3 is the milliequivalents of the double allylic structures in the vegetable oil relative to the total weight of the polyester components (PET and SIPA) in kilograms

TABLE 3

| Run No. | SIPA (mol %) | Vegetable Oil Type | Vegetable Oil (wt %) | Double Allylic Concentration (meq/kg) | Co (ppm) | Injection Molding Conditions |
|---|---|---|---|---|---|---|
| 7 | 0.24 | EPR | 0.40 | 13.2 | 100 | IM2 |
| 8 | 0.24 | EPR | 0.50 | 16.5 | 100 | IM2 |
| 9 | 0.24 | EPR | 0.75 | 24.8 | 100 | IM2 |
| 10 | 0.24 | GSO | 0.40 | 10.7 | 100 | IM2 |
| 11 | 0.24 | GSO | 0.50 | 13.3 | 100 | IM2 |
| 12 | 0.24 | GSO | 0.75 | 20.0 | 100 | IM2 |
| 13 | 0.24 | SBO | 0.40 | 8.7 | 100 | IM2 |
| 14 | 0.24 | SBO | 0.50 | 10.9 | 100 | IM2 |
| 15 | 0.24 | SBO | 0.75 | 16.3 | 100 | IM2 |
| 16 | 0.24 | SFO | 0.30 | 6.2 | 100 | IM2 |
| 17 | 0.24 | SFO | 0.50 | 10.3 | 100 | IM2 |
| 18 | 0.24 | SFO | 0.75 | 15.5 | 100 | IM2 |

These compositions were tested for oxygen scavenging performance using the Fibox 4-Trace Fiber Optic Trace Oxygen Meter (Model Oxy-4-Trace-04-006) and the testing method described above. The results of these tests are reported below in Table 4.

TABLE 4

| | Evening Primrose Oil | | | Grapeseed Oil | | | Soybean Oil | | | Sunflower Oil | | |
|---|---|---|---|---|---|---|---|---|---|---|---|---|
| Days | Run 7 ($\Delta O_2$) | Run 8 ($\Delta O_2$) | Run 9 ($\Delta O_2$) | Run 10 ($\Delta O_2$) | Run 11 ($\Delta O_2$) | Run 12 ($\Delta O_2$) | Run 13 ($\Delta O_2$) | Run 14 ($\Delta O_2$) | Run 15 ($\Delta O_2$) | Run 16 ($\Delta O_2$) | Run 17 ($\Delta O_2$) | Run 18 ($\Delta O_2$) |
| 0 | 0.000 | 0.000 | 0.000 | 0.000 | 0.000 | 0.000 | 0.000 | 0.000 | 0.000 | 0.000 | 0.000 | 0.000 |
| 5 | 0.101 | 0.030 | −0.001 | 0.082 | 0.019 | | | | | 0.182 | 0.007 | −0.009 |
| 7 | | | | | | 0.003 | 0.182 | 0.060 | | | | |
| 8 | | | | | | | | | 0.010 | | | |
| 11 | | | | | | | | | −0.001 | | | |
| 12 | 0.330 | 0.107 | −0.002 | 0.301 | 0.090 | | | | | | | |
| 13 | | | | | | | | | | 0.401 | 0.069 | −0.008 |
| 14 | | | | | | 0.001 | 0.388 | 0.152 | | | | |
| 18 | | | | | | | | | 0.000 | | | |
| 19 | | | | | | | | | | 0.670 | 0.105 | −0.014 |
| 20 | 0.564 | 0.192 | −0.005 | 0.503 | 0.137 | | | | | | | |
| 21 | | | | | | 0.000 | 0.598 | 0.255 | | | | |
| 25 | | | | | | | | | 0.001 | | | |
| 26 | | | | | | | | | | 0.924 | 0.188 | −0.014 |
| 27 | 0.780 | 0.312 | −0.003 | 0.677 | 0.172 | | | | | | | |
| 28 | | | | | | 0.002 | 0.783 | 0.347 | | | | |
| 33 | 0.945 | 0.414 | −0.004 | 0.814 | 0.190 | | | | −0.002 | | | |
| 34 | | | | | | | | | | 1.215 | 0.310 | −0.017 |
| 36 | | | | | | 0.001 | 1.002 | 0.458 | | | | |
| 39 | | | | | | | | | 0.000 | | | |
| 41 | 1.194 | 0.565 | −0.005 | 1.006 | 0.223 | | | | | | | |
| 42 | | | | | | 0.003 | 1.162 | 0.547 | | | | |

As can be seen in Table 4, each vegetable oil tested will not scavenge oxygen at a lower concentration in the composition (Runs 7, 10, 13 and 16). However, when added at a higher concentration (Runs 8, 9, 11, 12, 14, 15, 17 and 18) the vegetable oil will scavenge oxygen.

Additional experiments were conducted to determine the ability of a composition containing a vegetable oil and $TiO_2$ to scavenge oxygen. Compositions comprising the components listed in Table 5 were tested. Both runs utilized PET1 resin as the polyester component. The amount of cobalt reported in Table 5 is the measure of ppm cobalt from cobalt neodecanoate relative to the total amount of the polyester components, the vegetable oil and the $TiO_2$ present in the composition. The weight % of FSO1 reported in Table 5 is the measure of the weight of the flax seed oil relative to the total weight of the polyester components, the transition metal catalyst (cobalt salt) and the flax seed oil. The weight % of $TiO_2$ reported in Table 5 is the measure of the weight of $TiO_2$ relative to the weight of the entire composition. The $TiO_2$ was introduced into the composition as a masterbatch of 10% $TiO_2$ in PET. The double allylic concentration reported in Table 5 is the milliequivalents of the double allylic structures in FSO1 relative to the total weight of the polyester components in kilograms.

TABLE 5

| Run No. | $TiO_2$ (wt %) | Vegetable Oil Type | Vegetable Oil (wt %) | Double Allylic Concentration (meq/kg) | Co (ppm) | Injection Molding Conditions |
|---|---|---|---|---|---|---|
| 19 | 1.0 | | 0.0 | 0.0 | 90 | IM2 |
| 20 | 1.0 | FSO1 | 0.75 | 32.3 | 90 | IM2 |

These compositions were tested for oxygen scavenging performance using the Fibox 4-Trace Fiber Optic Trace Oxygen Meter (Model Oxy-4-Trace-04-006) and the testing method described above. The results of these tests are reported below in Table 6.

TABLE 6

| Days | Run 19 ($\Delta O_2$) | Run 20 ($\Delta O_2$) |
|---|---|---|
| 0 | 0.000 | 0.000 |
| 6 | 0.196 | −0.008 |
| 13 | 0.457 | −0.014 |
| 23 | 0.653 | −0.017 |
| 27 | 0.945 | −0.018 |
| 34 | 1.132 | −0.019 |
| 40 | 1.333 | −0.020 |

As can be seen in Table 6, the composition containing $TiO_2$ without vegetable oil does not scavenge oxygen while the composition with $TiO_2$ and vegetable oil does scavenge oxygen as evidenced by the decreased oxygen ingress after 40 days.

We claim:

1. An oxygen scavenging composition for containers comprising:
   at least one polyester component which is a copolyester containing a metal sulfonate salt group,
   a transition metal catalyst, and
   a vegetable oil comprising at least one molecule having a double allylic structure,
   wherein the copolyester containing a metal sulfonate salt group comprises at least one acid unit and at least one diol unit, the concentration of the double allylic structures of the vegetable oil in the composition is greater than 5.0 meq/kg of all of the polyester components, and the composition is substantially void of a polyamide.

2. The composition of claim 1, wherein the metal sulfonate salt group is a metal sulfoisophthalate derived from a metal salt of 5-sulfoisophthalic acid, its dimethyl ester or its glycol ester.

3. The composition of claim 2, wherein the metal salt of 5-sulfoisophthalic acid, its dimethyl ester or its glycol ester comprises a metal ion selected from the group consisting of $Na^+$, $Li^+$, $K^+$, $Zn^{2+}$, $Mn^{2+}$, $Co^{2+}$ and $Ca^{2+}$.

4. The composition of claim 1, wherein the metal sulfonate salt group is in a range selected from the group consisting of 0.01 to 10.0 mole percent, 0.01 to 2.0 mole percent, 0.05 to 1.1 mole percent, 0.10 to 0.74 mole percent and 0.10 to 0.6 mole percent based upon the total moles of acid units in all of the polyester components.

5. The composition of claim 1, wherein the transition metal catalyst is a compound containing at least one cobalt atom in a positive oxidation state.

6. The composition of claim 1, wherein the transition metal catalyst is a salt containing at least one cobalt atom in a positive oxidation state.

7. The composition of claim 1, wherein the transition metal catalyst is added to the composition at a level in a range selected from the group of between 10 and 600 ppm, between 20 and 400 ppm and between 40 and 200 ppm of metal relative to the total amount of the polyester components and vegetable oil present in the composition.

8. The composition of claim 1, wherein the composition is void of a polyamide.

9. The composition of claim 1, wherein the composition further comprises $TiO_2$.

10. The composition of claim 9, wherein the $TiO_2$ is present in the composition at a level in a range selected from the group consisting of between 0.1 and 15% by weight of the composition, between 0.1 and 10% by weight of the composition, between 0.1 and 5% by weight of the composition and between 0.1 and 2% by weight of the composition.

11. A preform manufactured from the composition of claim 1.

12. A biaxially oriented container manufactured from the preform of claim 11.

13. An oxygen scavenging composition for containers comprising:

at least one polyester component,
a transition metal catalyst,
a vegetable oil comprising at least one molecule having a double allylic structure, and
$TiO_2$, wherein the concentration of the double allylic structures of the vegetable oil in the composition is greater than 5.0 meq/kg of all of the polyester components, and the composition is substantially void of a polyamide.

14. The composition of claim 13, wherein the transition metal catalyst is a compound containing at least one cobalt atom in a positive oxidation state.

15. The composition of claim 13, wherein the transition metal catalyst is a salt containing at least one cobalt atom in a positive oxidation state.

16. The composition of claim 13, wherein the transition metal catalyst is added to the composition at a level in a range selected from the group of between 10 and 600 ppm, between 20 and 400 ppm and between 40 and 200 ppm of metal relative to the total amount of the polyester components and vegetable oil present in the composition.

17. The composition of claim 13, wherein the composition is void of a polyamide.

18. The composition of claim 13, wherein the $TiO_2$ is present in the composition at a level in a range selected from the group consisting of between 0.1 and 15% by weight of the composition, between 0.1 and 10% by weight of the composition, between 0.1 and 5% by weight of the composition and between 0.1 and 2% by weight of the composition.

19. A preform manufactured from the composition of claim 13.

20. A biaxially oriented container manufactured from the preform of claim 19.

* * * * *